(12) United States Patent
Crump et al.

(10) Patent No.: US 6,492,470 B2
(45) Date of Patent: *Dec. 10, 2002

(54) THERMOSETTING ACRYLIC GEL COAT

(75) Inventors: Larry Scott Crump, Gladstone, MO (US); Laurent Gerard Suspene, Vizcaya (ES); Gregory Scott Karr, Americus, KS (US), .; Kerry R. Williams, Lee's Summit, MO (US)

(73) Assignee: Cook Composites and Polymers, North Kansas City, MO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/218,275

(22) Filed: Nov. 10, 1998

(65) Prior Publication Data
US 2001/0051695 A1 Dec. 13, 2001

Related U.S. Application Data (63) Continuation-in-part of application No. 08/741,785, filed on Nov. 1, 1996, now abandoned.

(51) Int. Cl.[7] .............................. C08F 2/38; C08F 8/14; C08F 220/18; C08F 220/32; C09D 33/06
(52) U.S. Cl. ..................... 526/75; 526/222; 526/224; 526/227; 528/486
(58) Field of Search ........................ 526/75, 222, 224, 526/227; 528/486

(56) References Cited

U.S. PATENT DOCUMENTS

| | | | |
|---|---|---|---|
| 3,819,447 A | 6/1974 | Dalibor et al. ............. 156/330 |
| 4,037,038 A | 7/1977 | Tsuchiya .................... 526/56 |
| 4,177,338 A | 12/1979 | Vrancken et al. ........... 526/211 |
| 4,312,726 A | 1/1982 | Vrancken et al. ...... 204/159.23 |
| 4,357,455 A | * 11/1982 | Mondt et al. .................. 528/73 |
| 4,411,955 A | * 10/1983 | Mondt et al. ................ 428/413 |
| 5,190,997 A | * 3/1993 | Lindemann et al. .......... 524/44 |
| 5,356,947 A | * 10/1994 | Ali et al. ..................... 522/57 |
| 5,728,749 A | * 3/1998 | Vanhoye et al. ............ 522/141 |

FOREIGN PATENT DOCUMENTS

| | | |
|---|---|---|
| DE | 2336517 | 2/1975 |
| EP | 0273 795 A2 | 11/1986 |
| JP | 51-1735 B4 | 1/1979 |
| RU | 1060622 A1 | 12/1983 |

OTHER PUBLICATIONS

International Search Report of PCT/EP97/06017

* cited by examiner

Primary Examiner—Jeffrey Mullis
(74) Attorney, Agent, or Firm—Whyte Hirschboeck Dudek SC (57) ABSTRACT

An invention is disclosed which pertains to components for gel coat compositions, a process for making such gel coat compositions, and a process for making gel coated articles. Low molecular weight unsaturated polymers which incorporate multiple pendent and/or terminal acrylic or methacrylic vinyl groups are made by the addition polymerization of acrylate/methacrylate monomers with epoxy acrylates such as glycidyl methacrylate, followed by ring opening of the oxirane via action of an (meth)acrylic acid in combination with a ring-opening catalyst to produce the final unsaturated polymer. Gel coat compositions containing such polymers possess improved rheological properties and may be used to create durable in-mold coatings for articles requiring good hydrolytic stability and UV resistance.

16 Claims, 1 Drawing Sheet

FIG. 1

THERMOSETTING ACRYLIC GEL COAT

CROSS-REFERENCE TO RELATED APPLICATIONS

This application is a continuation-in-part of U.S. patent application Ser. No. 08/741,785 filed on Nov. 1, 1996, abandoned, the disclosure of which is incorporated by reference as if fully set forth herein.

BACKGROUND OF THE INVENTION

1. Field of the Invention

This invention is in the field of gel coat compositions, components for making gel coat compositions, processes for making gel coat compositions for use in making gel coated articles, processes for making gel coated articles, and gel coated articles.

2. Description of the Relevant Art

Durable polymeric coatings on composite materials known as gel coats are well known. They are typically found on composite materials that are exposed to the elements or that require a smooth glossy finish. Examples of items having gel coats include boat hulls, jet skis, pools, spas, composite body panels on automobiles, vans and trucks, and the like.

Such gel coats are often formed by applying a gel coat composition to the inside of an open mold, applying the composite article to the gel coat composition so that it is in adhering contact with the gel coat composition, curing the gel coat, and removing the gel coated article from the mold. Gel coated articles can also be made by forming a composite material in a multi-part mold, opening the mold sufficiently to inject or apply a gel coat composition, closing the mold, curing the gel coat, and removing the gel coated article from the mold.

Gel coat compositions are known which comprise oil-free unsaturated polyester condensation polymers in mixtures of unsaturated reactive diluents, such as styrene, which form crosslinked polymers by using a polymerization initiator, such as a peroxide. A limitation of gel coats made from unsaturated polyesters is that they typically have less than desired hydrolytic stability and durability. The hydrolytic instability can be attributed to polyol acidity and the presence of ester groups and the lack of exterior durability can be attributed to the presence of the aromatic component which is used as the reactive diluent.

Several approaches for addressing these limitations have been described in the prior art. These approaches include making polyester modifications and polyester alloys such as described in U.S. Pat. Nos. 4,587,323; 5,118,783; and 5,376,460 and in SPI Composites Institute Paper 17-H (1983); using epoxy chemistry such as described in U.S. Pat. Nos. 4,367,192 and 5,389,443 and in SPI Composites Institute Paper 15-C (1991); urethane/urea chemistry such as described in U.S. Pat. Nos. 3,928,299; 4,374,238 and 5,387,750; European Patent 254,232; and Plastics Technology, Vol. 34, No. 3, March 1988, page 13; and acrylic chemistry as described in U.S. Pat. Nos. 4,177,338; 4,742,121; and 5,045,613.

While these approaches have lead to improvements in hydrolytic stability and durability, room exists for further improvements in these characteristics. In addition, improvements are still needed in gel coat composition rheology. The desirable gel coat composition rheology has a high thixotropic ratio to allow for ease of application to the mold while preventing sagging or running after it is applied, particularly in open mold coating processes.

BRIEF SUMMARY OF THE INVENTION

These and other desirable objectives are achieved by gel coat compositions, components for making gel coat compositions, processes for making a gel coat composition for use in making gel coated articles, processes for making gel coated articles and gel coated articles of the present invention.

One aspect of the present invention is a polymer for making gel coat compositions represented by the formula:

wherein

X is a divalent saturated aliphatic group having a pendant ester group without any polymerizable double bonds;

Y is a divalent saturated aliphatic group having a pendant group Z;

Z is a group of the formula:

in which $R^1$ is an aliphatic, saturated, hydroxyl-containing group and $R^2$ is a hydrocarbyl group with at least one polymerizable carbon—carbon double bond;

W is a group of the formula $R^3$—S— in which $R^3$ is a hydrocarbyl group having 2 to 14 carbon atoms and not having a polymerizable carbon—carbon double bond;

m is a number in the range from 1 to 10;

n is a number in the range from 1 to 50;

n/m is in the range from about 1 to 5; and the polymer has a number average molecular weight of at least 2,500.

Another aspect of this invention is a process for making a polymer for use in a gel coat composition comprising:

(a) reacting at least one monomer of the formula:

in which $R^4$ is a hydrogen atom or a saturated aliphatic group of 1 to 8 carbon atoms and $R^1$ is a saturated aliphatic group of 1 to 8 carbon atoms with at least one monomer of the formula:

in which $R^6$ is a hydrogen atom or a saturated aliphatic group of 1 to 8 carbon atoms $R^1$ represents a divalent, aliphatic, saturated, hydroxyl-containing group having at least one carbon atom and the molar ratio of the compound of formula (II) to the compound of formula (III) is in the range from about 1:1 to about 5:1;

(b) adding a polymerization initiator;

(c) adding a polymer chain terminating compound of the formula $$R^3—SH$$

in which $R^3$ is a hydrocarbyl group having at least about 2 carbon atoms and not having a polymerizable carbon—carbon double bond, such that the polymer produced in step (a) will have a number average molecular weight of at least 2,500 after completing step (b); and (d) reacting the product of step (b) with a monomer of the formula:

$$CH_2{=}C(R^7)—C(O)—OH \quad (IV)$$

in which $R^7$ is either —H or —$CH_3$, in an oxirane ring-opening reaction.

Yet another aspect of this invention is a gel coat composition comprising:

(a) at least one polymer for making a gel coat composition described above and (b) a rheology synergist concentrate.

Yet another aspect of this invention is a process for making a gel coat comprising:

(a) dispersing in the polymer described above a rheology synergist concentrate, a free radical initiator and, optionally, a filler; and (b) adding as needed an acrylic monomer until a predetermined viscosity is obtained.

Another aspect of this invention is a rheology synergist concentrate for making a gel coat composition comprising:

(a) at least one thixotrope;

(b) at least one aliphatic alcohol having from 1 to 20 carbon atoms and 1 to 3 hydroxy groups; and (c) at least one alkali metal salt of an organic acid.

Yet another aspect of this invention is a process for making a gel coated article comprising:

(a) applying to a mold the gel coat composition described above;

(b) partially curing the gel coat of step (a);

(c) applying to the exposed surface of the gel coat of step (b) an article having a shape corresponding to the shape of the gel coat in the mold, to form a laminate;

(d) allowing the laminate of step (c) to further cure to form the gel coated article; and (e) removing the gel coated article of step (d) from the mold.

Another aspect of this invention is the gel coated article obtainable from the polymers, compositions, and processes of the present invention described above.

DETAILED DESCRIPTION OF THE INVENTION

The polymers according to this invention may be represented by formula (I).

$$W—(X)_{\overline{n}}—(Y)_{\overline{m}}—H \quad (I)$$
$$\qquad\qquad\quad |$$
$$\qquad\qquad\quad Z$$

In that formula, X is a divalent saturated aliphatic group having a pendant ester group without any polymerizable carbon—carbon double bonds. Preferably, X is substituted or unsubstituted ethylene and may, for example, be represented by the formula:

$$—\underset{R^8}{\underset{|}{C(CH_3)}}—CH_2—$$

wherein $R^8$ is a pendant ester group, preferably —C(O)—O—$R^9$ in which $R^9$ is an aliphatic group having from 1 to 20, more preferably 1 to 12, and even more preferably 1 to 8, carbon atoms.

Y is a divalent saturated aliphatic group having a pendant group Z. Preferably, Y is substituted or unsubstituted ethylene, and may, for example, be represented by the general formula:

$$—\underset{Z}{\underset{|}{C(CH_3)}}—CH_2—$$

Z is a group of the formula:

$$—CO—O—R^1—O—CO—R^2 \quad (IA)$$

in which $R^1$ is a divalent, aliphatic, saturated, hydroxyl-containing group. In a preferred embodiment, $R^1$ is represented by the formula:

$$—CHOH—H_2—$$

or $$—\underset{CH_2—OH}{\underset{|}{CH}}—$$

$R^2$ is preferably an aliphatic group having from 2 to 20 carbon atoms, more preferably from 2 to 8 carbon atoms, and even more preferably from 2 to 4 carbon atoms, and at least one polymerizable carbon—carbon double bond, preferably just one polymerizable carbon—carbon double bond.

W is a group of the formula $R^3$—S— in which $R^3$ is preferably a hydrocarbyl group, such as a substituted or unsubstituted alkyl group, having at least 2, more preferably at least 10, carbon atoms up to 20, preferably up to 14, carbon atoms, such as one derived from 2-mercaptoethanol.

The number of Y units, m, is a number in the range from at least about 1 to about 10, preferably in the range from at least about 1 to about 5. The number of X units, n, is a number in the range from at least about 1 to about 50, preferably in the range from at least about 1 to about 10. The n/m ratio is a number in the range from about 1, preferably at least about 1.5, more preferably at least about 2, to about 5, preferably up to about 4, and more preferably up to about 3.

The first step in making the polymer of this invention is to make a saturated acrylic polymer by the polymerization of an acrylic monomer with an epoxy acrylate. Examples of acrylic monomers include methyl methacrylate, lauryl methacrylate, butyl methacrylate, etc. Examples of epoxy acrylates include glycidyl methacrylate and glycidyl acrylate. Polymerization is generally initiated using a chemical polymerization initiator. A non-peroxide initiator containing an azo group, such as 2,2-azobis (2,4-dimethylvalevonitrile), is preferred. The amount of initiator is preferably in the range from 0.1 to 1 parts by volume. The polymer chains are terminated by reacting them with a mercaptan which does not have any polymerizable carbon—carbon double bonds. The mercaptan is added in an amount which is preferably in the range from 0.5 to 5 parts by volume.

The second step in making the polymer of this invention is to make an unsaturated acrylic polymer from the above saturated acrylic polymer by reacting an (meth)acrylic acid with the epoxy functional groups on the saturated acrylic polymer by using a ring opening catalyst such as triphenylphosphine, etc. The resulting polymer can have a number average molecular weight in the range from 900 to 3,000.

In one embodiment, the resulting polymer has a number average molecular weight of at least 2,500, preferably greater than 3,000, such as at least about 4,100.

In another embodiment, the ring opening catalyst is a catalyst other than a chromium-containing catalyst and/or the resulting polymer preferably has a Gardner color of about 2 or less, more preferably about 1 or less, on the Gardner-Holt color scale from 0 to 18 (in which 18 represents maximum color brightness and saturation) measured according to ASTM D 1544.

Lastly, an acrylic monomer is added until the solution has reached a predetermined viscosity, which is preferably less than 1000 centipoise as measured by Brookfield viscometer at 77° F.

The resulting polymer can be further crosslinked with various crosslinking agents, such as monofunctional and multifunctional methacrylates and acrylates, as well as other monomers, oligomers, and polymers capable of participating in free-radical addition polymerizations such as styrene, vinyl toluene, alpha methyl styrene, etc.

The polymers of this invention are useful for making gel coat compositions. The gel coat composition of the present invention is preferably comprised of at least one polymer as described above combined with a rheology synergist concentrate.

The rheology synergist concentrate is comprised of at least one thixotrope, at least one aliphatic hydroxide having from 1 to 20 carbon atoms and 1 to 3 hydroxy groups, and at least one alkali metal salt of an organic acid.

Preferred thixotropes in the gel coat compositions according to this invention include silica, such as fumed silica and precipitated silica, silica gels, and bentonite clays. The thixotrope is preferably present in an amount of at least about 1 wt %, more preferably at least about 1.5 wt %, and even more preferably at least about 1.8 wt %, up to about 5 wt %, more preferably up to 2.5 wt %, and even more preferably up to 2.2 wt %, based on the total weight of the gel coat composition.

Preferred aliphatic hydroxides in the gel coat compositions according to this invention are polyols including glycols, such as ethylene glycol, propylene glycol, etc., and glycerol, sorbitol, ethoxylated sorbitol, etc. The aliphatic hydroxide is preferably present in an amount of at least about 0.2 wt %, more preferably at least about 0.3 wt %, up to about 1.0 wt %.

Preferred alkali metal salts of organic acids in the gel coat compositions according to this invention include salts in which the alkali metal is $Li^+$, $K^+$, and/or $Na^+$. The organic acid from which the salt is derived may be a carboxylic acid having from 6 to 10 carbon atoms, such as hexanoic acid, octanoic acid, neodecanoic acid, etc. Specific examples include potassium octoate, which is available from Mooney Chemical Company under the trademark Hexchem™, calcium octoate, which is available from Huls America under the trademark Nuxtra™, etc. The alkali metal salt is preferably present in an amount of at least about 200 ppm, more preferably at least about 250 ppm, and even more preferably at least about 280 ppm, up to about 800 ppm, more preferably up to about 400 ppm, and even more preferably up to about 320 ppm.

The combination of the aliphatic hydroxide and the alkali metal salt of an organic acid is referred to herein as a synergist package. When they are added in combination, the ratio of aliphatic hydroxide to alkali metal salt is preferably in the range from 1:1 to 3:1, more preferably from 1.5:1 to 2.5:1. For example, a preferred weight ratio of sorbitan monolaurate to Potassium Hexchem™ is about 2 to 1. The synergist package is preferably present in an amount of at least about 0.3 wt % up to about 1.0 wt %, based on the weight of gel coat composition.

Other additives, such as fillers, thixotropic agents, rheological control additives, UV absorbers, solvents and the like, can be incorporated into the coating composition as desired.

In a preferred embodiment, the coating composition contains less than 10, more preferably not more than about 5, even more preferably not more than about 3, weight percent aromatic vinyl monomer. One reason compositions containing such low amount of aromatic vinyl monomer are preferred is because the cured gel coat is less susceptible to discoloration upon exposure to weathering, especially upon exposure to UV radiation.

Examples of fillers include clay, magnesium oxide, magnesium hydroxide, calcium carbonate, calcium silicate, mica, aluminum hydroxide, barium sulfate, talc, etc. Fillers are defined herein as not including the thixotropes as defined above, as well as coloring pigments. Preferred amounts of filler are in the range from 5 to 30 wt %.

In a preferred embodiment, the gel coat may be made by high speed dispersion of thixotrope and fillers into the above resin solution. A synergist package is then added. A free radical initiator is then added which will facilitate the formation of free radicals necessary for curing the gel coat composition. Lastly, an acrylic monomer is added to the gel coat composition until the desired viscosity is obtained.

In one embodiment of this invention, the free radical initiator is a photoinitiator, and the gel coat composition is cured by UV radiation. These include photoinitiators such as benzophenone, acetophenone and its derivatives, benzoin, benzoin ethers, thioxanthones, halogenated compounds, oximes, and acyl phosphine oxides. Preferred are those photoinitiators which do not strongly discolor when exposed to sunlight, e.g. the acyl phosphine oxides and 2-hydroxy-2-methyl-1-phenylpropan-1-one.

In another embodiment of the gel coat composition of the invention, a thermally activated cure system is employed, such as a system comprising a metal catalyst, a polyallylic initiator, such as SANTOLINK XI-100 from Monsanto, and, optionally, a nonpolyallylic peroxide initiator. In a preferred embodiment of this invention, the thermally activated free radical initiator is an oxidation/reduction system. The oxidation/reduction system comprises a metal catalyst and any combination of one or more compounds selected from the following: amines, alkyl acetoacetates, alkyl acetoacetamides, and alkyl and aryl acetanilides. The gel coat composition may be cured by heat (typically induced by infrared (IR) radiation). The cure temperature is preferably less than 40° C., more preferably less than 30° C.

The metal catalyst is any metallic salt that will promote or accelerate the rate of cure of the gel coat composition. Typically, these catalysts are salts of metals and organic acids. Representative metals are cobalt, manganese, vanadium, potassium, zinc and copper. The metal catalyst includes, among others, a variety of metal driers. Preferred metallic salt driers include the octoates, napthenates and neodeconates of cobalt, manganese, vanadium, potassium, zinc and copper. An especially preferred catalyst is cobalt octoate solution in an amount preferably in the range from about 0.012 to 0.036 wt % of cobalt (e.g., 0.1 to 0.3% wt % of a 12% cobalt octoate solution may be used).

The oxidation/reduction system also contains any combination of one or more compounds selected from the following: amines, alkyl acetoacetates, alkyl acetoacetamides, and alkyl and aryl acetanilides. For example, dimethyl aniline is added in an amount preferably in the range from 0 to 0.4 wt %, more preferably 0.1 to 0.4 wt %. Dimethyl acetoacetate and/or ethyl acetoacetate and/or methyl acetoacetate and/or acetoacetanilide, etc. may be added preferably, in an amount ranging from 0 to 0.2 wt %, more preferably 0.05 to 0.15 wt %, to the oxidation/reduction system.

In a preferred embodiment of this invention, a peroxide based co-initiator is used, more preferably in conjunction with the oxidation/reduction system, to cure the gel coat and the laminating resin. These co-initiators are typically non-polyallylic peroxides. They include any of the common peroxides such as benzoyl peroxide; dialkyl or aralkyl peroxides such as di-t-butyl peroxide, dicumyl peroxide, cumylbutyl peroxide, 1,1-di-t-butyl-peroxy-3,5,5-trimethylcyclohexane, 2,5-dimethyl-2,5-di-t-butylperoxy hexane and bis(alpha-t-butylperoxy isopropylbenzene); dialkanoyl peroxides such as 2,5-dimethyl-2,5-di(2,5-diethylhexanoyl peroxy) hexane; peroxyesters such as t-butylperoxy pivalate, t-butyl peroctoate, t-butyl perbenzoate, 2,5-dimethylhexyl-2,5-di(perbenzoate), dialkylperoxymonocarbonates and peroxydicarbonates; hydroperoxides such as t-butyl hydroperoxide, p-methane hydroperoxide, pentane hydroperoxide and cumene hydroperoxide; and ketone peroxides such as cyclohexanone peroxide and methyl ethyl ketone peroxide. Typically, a methyl ethyl ketone peroxide (MEKP) co-initiator is used which consists of a solution blend of various peroxides and hydroperoxides, including monomer MEKP, dimer MEKP, cyclic trimer MEKP, and hydrogen peroxide, in an inert carrier such as dibutyl phthalate.

Preferably, the co-initiator is t-butyl peroctoate (tBP), available from Atochem, a division of Elf Aquitaine, under the trademark Lupersol 256, or 2,5-dimethyl-2,5-di(2,5-diethylhexanoyl peroxy) hexane, available from Akzo under the trademark, Trigonox 141. Gel coat of Example 1B below according to this invention cures 47% to completion isothermally when cured with 2.0% MEKP initiator. The inventors have found that the same gel coat cures 82% to completion isothermally when cured with 1.5% tBP initiator. In general, the time period necessary for curing is less than or equal to two hours when using a tBP or 2,5-dimethyl-2,5-di(2,5-diethylhexanoyl peroxy) hexane initiator.

Preferably, the concentration of the co-initiator solution ranges from about 1 wt % to about 2.5 wt %, preferably from about 1.2 wt % to about 2 wt %.

Other methods of curing the gel coat are possible and will be apparent to one skilled in the art. The cured gel coat preferably has a Gardner color of about 2 or less, more preferably about 1 or less, on the Gardner-Holt color scale from 0 to 18 measured according to ASTM D 1544.

The gel coating process is well known in the art. The gel coat composition is applied to the surface of a mold and allowed to partially cure. If the gel coat composition contains a photoinitiator as the free radical initiator, then the gel coat composition is exposed to radiation having the appropriate wavelength and intensity to activate the photoinitiator. If the gel coat composition contains a thermally activated fee radical initiator, then the gel coat composition is exposed to heat, preferably in the form of IR radiation. The partially cured gel coat composition is relatively soft, possibly even tacky.

An article to be gel coated is applied to the partially cured gel coat composition to form a laminate and the laminate undergoes a second stage cure. This second stage cure may be carried out by heating the mold to an elevated temperature or by other means, such as irradiation. Afterwards, the gel coated article is removed from the mold. The gel coat becomes an integral part of the finished laminate and is usually used to improve surface appearance. This process is described in more detail in Lubin, *Handbook of Composites* p. 764, Van Nostrand Reinhold Company (1982), which is incorporated herein by reference.

The article to be gel coated may be a fully or partially cured polymer resin or composite of reinforcing material in a polymer resin matrix. The reinforcing material may be selected from any conventionally used in the composite plastics industry, such as glass fiber, polyethylene fiber, carbon fiber, metal fiber, ceramic fiber, etc., and the resin may be selected from a wide range of resins, such as polyester resins, epoxy resins, polyester carbonate resins, polycarbonate resins, polystyrene resins, polymethylmethacrylate resins, etc. The mold surface preferably corresponds to the shape of the article in negative relief. It may be an open mold or a matched mold.

The examples which follow are illustrative of the present invention. They are not to be taken as limiting the scope of the claimed invention. Unless stated otherwise, all percents and ratios of amounts are by weight.

EXAMPLES

Description of Testing Methods

Panel Preparation t-butyl peroctoate (tBP) (1.5 wt %) is added to the gel coat and stirred for 1 minute. The gel coat is then sprayed onto a waxed and buffed flat tempered glass plate to a thickness of 15–40 MILS (1 MIL-0.001 inch). After curing for 1–2 hours, an ⅛" laminate is made using chopped fiberglass and a polyester resin (40% mat/60 % resin). A methyl ethyl ketone peroxide (MEKP)co-initiator at 1.2 wt % is used to cure the polyester resin. The laminate is allowed to cure for 16–20 hours, then removed from the mold and cut into test parts.

Boiling Water Resistance

A 7"×7" part from the above panel is connected to a boiling water tank, using deionized water, (ANSI Z124) and exposed for 100 hours. The exposed panels are then rated on a scale of 0–5 for blisters, color change, change in fiber prominence, cracks, and loss of visible gloss with 0=no change, and 5=maximum change.

QUV Weathering

Test panels are also subjected to the weathering test procedure (ASTM 53, incorporated herein by reference) using the cycle of 4 hours condensation at 40 C., followed by 4 hours exposure at 60 C. to a UV bulb with a peak energy of 340 nm. Test panels are inspected at 500 hour intervals.

Rheology, Brookfield Viscometer

The thixotropy of the gel coat is determined by use of a Brookfield Viscometer. An 8 oz. jar of gel coat at 77 F. is used as a test sample. Using a #4 spindle on the viscometer the viscosity is measured at 2 and 20 rpm. The thixotropic index is calculated as the ratio of the viscosity at 2 rpm to the viscosity at 20 rpm.

Cure Testing, DSC

The percent cure of a gel coat achieved by the free radical initiator is measured by differential scanning calorimetry (DSC). A sample of the gel coat is cured with the free radical initiator and the isothermal cure energy of the crosslinking reaction is measured by DSC under isothermal conditions, (30 C.). The sample's residual cure is measured by a temperature ramp test which consists of ramping the DSC cell temperature to 250 C. after a 3 hour cure time or when the exotherm has stopped. The percent cure is then determined by dividing the isothermal cure energy by the total cure energy, the total cure energy being equal to the isothermal cure energy plus the residual cure energy determined from the temperature ramp test.

Pigment Dispersions, Roll Mill

Pigment dispersions in an acrylic resin are made with a three roll mill. The pigments are milled until a 7 Hegman grind is achieved.

Abusive Spray Test on Pigment Dispersions

The following is the test procedure for an Abusive Spray Test:
1) Wax and buff and glass mold.
2) Make a tape line near the bottom of the mold with 1" tape.
3) Cover half of the upper portion of the mold with 3" tape.
4) Weigh 100 g and 200 g samples of gel coat.
5) Mix the 100 g sample in the correct proportion with the co-initiator as specified.
6) Use part of this sample to make a draw-down with a 0.023" gap in the lower section of the mold, below the 1" line.
7) With the remainder of the this sample, make overspray at 35 psi static pressure and 15 psi pot pressure. (Static pressure refers to the air pressure directed into the liquid coating streamer at the spray tip of the spray gun. This variable is used to regulate the degree of fluid atomization. Pot pressure refers to the air pressure applied to surface of the liquid coating in the container (pot) which holds the coating prior to spray. This pressure forces the liquid through a suction tube and continuing to the spray tip. The level of pot pressure is used to regulate the flow rate of the coating through the spray gun.).
8) Pull 3" tape.
9) Wait a time interval equal the gel time of this sample, then mix the 200 g sample in the correct proportion with the co-initiator as specified.
10) Adjust the spray gun to 56 psi static pressure and 15 psi pot pressure.
11) Spray 18–22 MILS over the entire mold using 3 passes.
12) Pull the 1" tape.
13) Pour the remainder of the 200 g sample onto the mold such that the pourdown is centered over the line which divided the overspray and nonoverspray sections.
14) Place the mold in a vertical position.
15) After the film has gelled, place mold in a 150 F. oven for 30 –40 minutes.
16) Remove the mold from oven, let cool, tape then de-mold.

Figure 1:
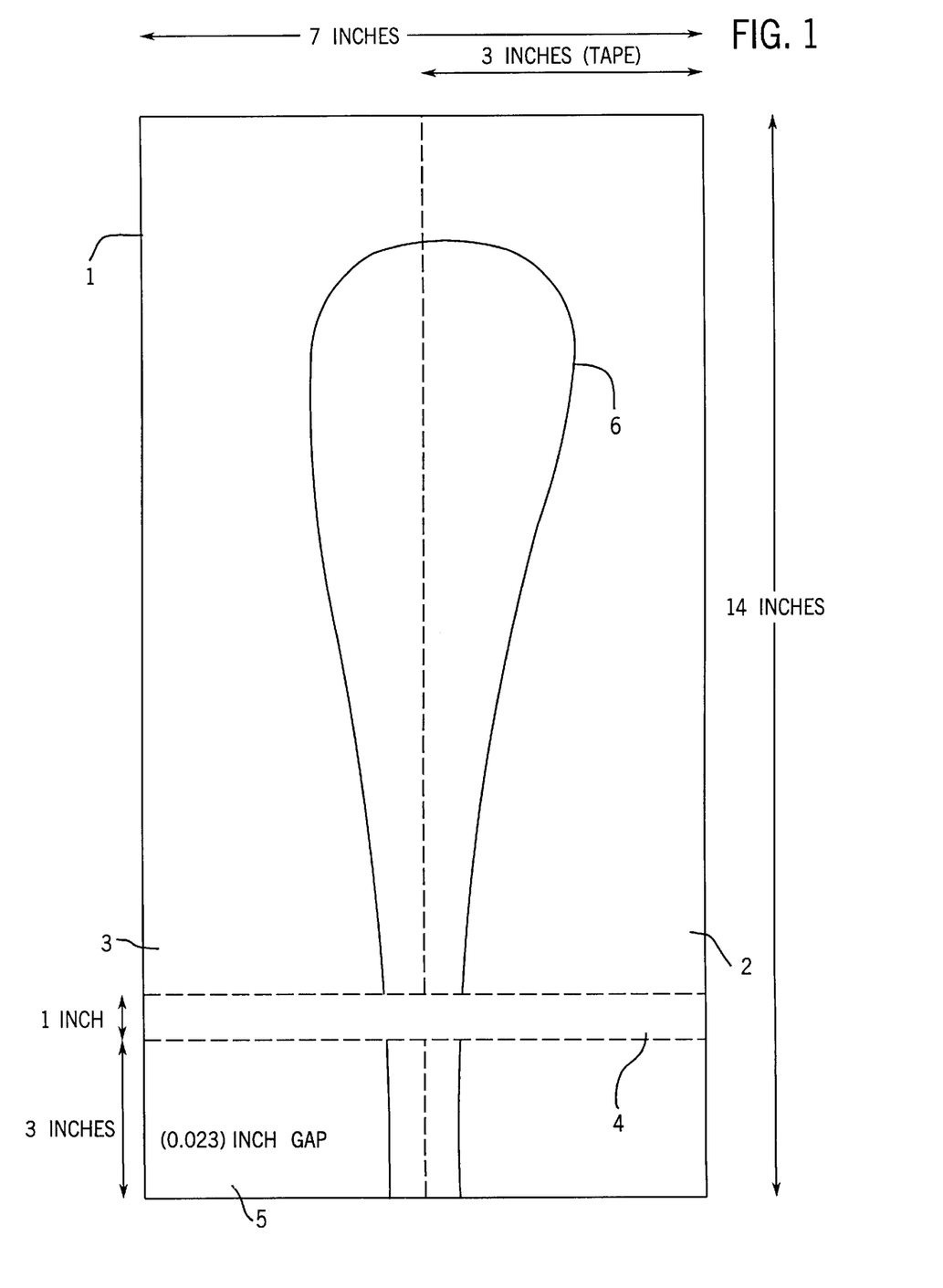
FIG. 1 shows a diagram illustrating the abusive spray test, which is described in more detail below.

FIG. 1 shows a diagram illustrating the abusive spray test. FIG. 1 shows a mold 1 having a spray area 2, overspray area 3, tapeline sag area 4, drawdown area 5 and a typical pour down area 6.

Comparative Example 1

A. Preparation of a Conventional Orthophthalic Neopentyl Glycol Unsaturated Polyester Resin In a reactor equipped with a stirrer, thermometer, a water separating column fitted with a reflux condenser, and a nitrogen inlet, the following ingredients are added.

| Components | Grams |
| --- | --- |
| Neopentyl Glycol | 1840 |
| Propylene Glycol | 1042 |
| Phthalic Anhydride | 2024 |
| Maleic Anhydride | 1594 |

The charged mixture is heated to reflux and a total of 539 parts of water are distilled off. The reaction mixture is held at 220 C. until an acid number of 15–20 is obtained. The reaction mixture is then cooled to less than 140 C. and the following ingredients are added.

| Components | Grams |
| --- | --- |
| Methoxyhydroquinone | 0.9 |
| Styrene | 3500 |

B. Preparation of a Conventional Gel Coat

A gel coat is prepared by blending the following ingredients:

| Components | Grams |
| --- | --- |
| Resin solution from Part A above | 42.30 |
| 12% Cobalt drier | 0.14 |
| 15% Potassium Hexchem 97 | 0.20 |
| Amorphous-Fumed Silica | 1.06 |
| Amorphous-Silica | 1.27 |
| Magnesium Silicate | 8.46 |
| Calcium Carbonate | 8.46 |
| Titanium Dioxide | 10.58 |
| Styrene | 15.44 |
| Methyl Alcohol | 0.74 |
| Sorbitan Monolauarate | 0.42 |

The resulting coating can then be cured by adding a 2.0 wt % MEKP co-initiator and spraying the coating on a glass mold as described in the Test Panel Preparation.

Example 1

A. Preparation of an Acrylic Polymer According to the Present Invention

A reactor equipped with a stirrer, thermometer, total condenser, and nitrogen sparge inlet is charged with 4906 grams of methyl isobutyl ketone. The solvent is heated to 194 F. and the following two mixtures of components are added to the reactor, dropwise and separately, over a two hour period:

| Components | Grams |
| --- | --- |
| MIXTURE 1 | |
| Glycidyl Methacrylate | 1248 |
| Acrylate | 2248 |
| Lauryl Methacrylate | 3468 |
| 2-Mercaptoethanol | 20 |
| MIXTURE 2 | |
| 2,2-azobis (2,4-dimethylvalevonitrile) | 216 |
| Methyl Isobutyl Ketone | 1224 |

The reaction is held at 194 F. for two hours after the addition period. Once the hold period is complete, the reactor is set to recover solvent and heated to 300 F. At 300 F., a vacuum of 25 inches of Hg is pulled until no more solvent leaves the reactor. The resulting polymer is cooled to 190–200 F.

Once the reaction temperature has reached 19–200 F., the reactor's atmosphere is changed from nitrogen to oxygen and 1 gram of 4-methoxyphenol is added. The following ingredients are mixed together, making sure all solids are dissolved. Then this mixture is added to the reactor.

| Components | Grams |
| --- | --- |
| Triphenylstilbine | 60 |
| Triphenylphosphine | 20 |
| Methacrylic Acid | 720 |

This reaction is exothermic and the reactor temperature must be kept below 230 F. Once the exotherm subsides, the reaction is held at 205–215 F. until an acid number of less than 5 and epoxide equivalent weight of greater than 8000 is obtained.

The resultant polymer is then cooled to 200 F. and reduced to 67 wt % solids with 1,4-butanediol dimethacrylate.

B. Preparation of an Acrylic Gel According to the Present Invention

A gel coat is prepared by blending the following ingredients:

| Components | Grams |
| --- | --- |
| Acrylic Resin Solution from Part A Above | 54.50 |
| Titanium Dioxide | 19.0 |
| Amorphous-Fumed Silica | 2.0 |
| Magnesium Silicate | 5.0 |
| Sorbitan Monolauarate | 0.20 |
| 12% Cobalt drier | 0.15 |
| 15% Potassium Hexchem 97 | 0.20 |
| Ethylene Glycol | 0.20 |
| 2,4-Pentanedione | 0.10 |
| Dimethylparatoluidine | 0.20 |
| Methyl Methacrylate | 18.50 |
| Paraffin Wax | 0.20 |

QUV Weathering Comparison Between Gel Coats in Comparative Example 1B and Example 1B of the Present Invention

| Gel Coat | Hours | dE | % Gloss |
| --- | --- | --- | --- |
| Comparative | 500 | 3.19 | 82.0 |
| Example 1B | 3000 | 7.14 | 17.5 |
| Example 1B of | 500 | 1.14 | 97.3 |
| the Present Invention | 3000 | 1.26 | 92.2 |

Boil Test Comparison Between Gel Coats in Comparative Example 1B and Example 1B of the Present Invention

| Gel Coat | Comparative Example 1B | Example 1B of the Present Invention |
| --- | --- | --- |
| Blisters | 4.47 | 2.75 |
| Color Change | 1.60 | 0.69 |
| Fiber Prominence | 0.47 | 1.67 |
| Cracks | 1.23 | 1.08 |
| Loss of Gloss | 0.4 | 0.00 |
| Total | 8.17 | 6.19 |

Rheology, Brookfield Viscometer

Viscosity measurements obtained using a Brookfield viscometer of a gel coat similar to Comparative Example 1B are as follows:

| RPM | Viscosity (cps) |
| --- | --- |
| 2 | 35,750 |
| 20 | 5,500 |
| Thixotropic Index | 6.50 |

Viscosity measurements obtained using a Brookfield viscometer of a gel coat similar to Example 1B without the synergist package are as follows:

| RPM | Viscosity (cps) |
| --- | --- |
| 2 | 150 |
| 20 | 150 |
| Thixotropic Index | 1.00 |

Viscosity measurements obtained using a Brookfield viscometer of a gel coat similar to Example 1B with the synergist package are as follows:

| RPM | Viscosity (cps) |
| --- | --- |
| 2 | 26,000 |
| 20 | 4,050 |
| Thixotropic Index | 6.40 |

Cure Testing, DSC

A gel coat similar to Comparative Example 1B cures 75% to completion isothermally when cured with 2.0% MEKP co-initiator. A gel coat similar to Example 1B of the present invention cures 47% to completion isothermally when cured with 2.0% MEKP co-initiator. The same gel coat (Example 1B) when cured with 1.5% tBP co-initiator, cures 82% to completion isothermally. In general, the time period is less than or equal to two hours when using a tBP co-initiator.

Example 2

An unsaturated polyester (PE) pigment dispersion resin was added to a gel coat similar to Example 1B. The QUV weathering test and a boiling water test was performed on panels both with and without the unsaturated polyester pigment dispersion resin added.

| Components | Grams |
| --- | --- |
| Example 1B | 93.0 |
| Unsaturated Polyester Resin | 7.0 |

QUV Weathering Comparison Between Gel Coats

| Gel Coat Retention | Hours | dE | % Gloss |
| --- | --- | --- | --- |
| With PE Resin | 500 | 1.19 | 97.1 |
|  | 3000 | 1.43 | 54.4 |
| Without PE Resin | 500 | 1.12 | 97.4 |
|  | 3000 | 1.77 | 73.3 |

Boil Test Comparison Between Gel Coats

| Gel Coat | With PE Resin | Without PE Resin |
| --- | --- | --- |
| Blisters | 2.75 | 2.75 |
| Color Change | 1.92 | 0.61 |
| Fiber Prominence | 0.86 | 0.69 |
| Cracks | 1.50 | 0.05 |
| Loss of Gloss | 0.00 | 0.00 |
| Total | 7.03 | 4.10 |

Example 3

A. Preparation of an Acrylic Pigment Dispersion Resin

A reactor equipped with a stirrer, thermometer, total condenser, and nitrogen sparge inlet was charged with 4906 grams of isopropanol. The solvent is heated to 194 F. and the following two mixtures of components are added to the reactor, dropwise and separately, over a two hour time period:

| Components | Grams |
| --- | --- |
| MIXTURE 1 | |
| Glycidyl Methacrylate | 1696 |
| Butyl Acrylate | 4581 |
| Lauryl Methacrylate | 2863 |
| MIXTURE 2 | |
| 2,2-Azobis(2,4-dimethylvaleronitrile) | 216 |
| Isopropanol | 1223 |

The reaction is held at 194 F. for two hours after the addition time period. Once the hold period is complete, the reactor is set to recover solvent and heated to 300 F. At 300 F., a vacuum of 25 inches of Hg is pulled until no more solvent leaves the reactor. The resulting polymer is cooled to 190–200 F.

Once the reaction temperature has reached 19–200 F., the reactor's atmosphere is changed from nitrogen to oxygen and 1 gram of 4-methoxyphenol is added. The following ingredients are mixed together, making sure all solids are dissolved. Then this mixture is added to the reactor.

| Components | Grams |
| --- | --- |
| Triphenylstilbine | 60 |
| Triphenylphosphine | 20 |
| Acrylic Acid | 859 |

This reaction is exothermic, and the reactor temperature must be kept below 230 F. Once the exotherm subsides, the reaction is held at 205–215 F. until an acid number of less than 5 and an epoxide equivalent weight of greater than 8000 is obtained.

B. Preparation of a Gel Coat Containing the Acrylic Dispersion Resin

The acrylic pigment dispersion resin obtained in Part A above was added to a gel coat using a procedure similar to that used in Example 1B. QUV weathering test and a boiling water test was run on a panel with and without the acrylic pigment dispersion resin added.

| Components | Grams |
| --- | --- |
| Example 1B Gel Coat | 93.0 |
| Acrylic Pigment Dispersion Resin | 7.0 |

QUV Weathering Comparison Between Gel Coats

| Gel Coat Retention | Hours | dE | % Gloss |
| --- | --- | --- | --- |
| With Acrylic Resin | 500 | 1.85 | 94.4 |
|  | 2500 | 1.69 | 94.2 |

-continued

| Gel Coat Retention | Hours | dE | % Gloss |
|---|---|---|---|
| Without Acrylic Resin | 500 | 1.42 | 95.7 |
|  | 2500 | 1.46 | 93.8 |

Boil Test Comparison Between Gel Coats

| Gel Coat | With Acrylic Resin | Without Acrylic Resin |
|---|---|---|
| Blisters | 2.67 | 2.92 |
| Color Change | 1.42 | 1.5 |
| Fiber Prominence | 0.58 | 0.92 |
| Cracks | 1.50 | 0.93 |
| Loss of Gloss | 0.00 | 0.00 |
| Total | 6.17 | 6.27 |

Example 4

A. Preparation of Acrylic Pigment Dispersions

Orange and a white pigment dispersions were made using a three roll mill. The dispersions were made in an acrylic resin similar to Example 3A using the following ingredients.

|  | Grams |
|---|---|
| White Dispersion |  |
| Example 3A Resin | 50 |
| Titanium Dioxide | 50 |
| Orange Dispersion |  |
| Example 3A Resin | 75 |
| Mono-azo Orange | 25 |

B. Preparation of an Orange Gel Coat

An orange gel coat was made using the pigment dispersion in Part A above and a neutral gel coat similar to Example 4 only without the titanium dioxide.

| Orange Gel Coat | Grams |
|---|---|
| Example 1B Gel Coat Base (w/o TiO$_2$) | 86.9 |
| White Dispersion | 2.1 |
| Orange Dispersion | 11.0 |

An abusive spray test performed on the orange gel coat above showed little pigment flocculation or separation.

Although the process of this invention has been described in considerable detail by the preceding examples, this detail is for the purpose of illustration only and is not to be construed as a limitation on the spirit and scope of the invention as described in the appended claims.

What is claimed is:

1. An unsaturated acrylic polymer represented by the formula:

wherein

X is an ethylene having a pendent ester group without any polymerizable double bonds represented by the formula —C(O)—O—$R^9$ in which $R^9$ is an aliphatic group having from 1 to 20 carbon atoms;

Y is a divalent saturated aliphatic group;

$R^1$ divalent, aliphatic saturated hydroxyl-containing group;

$R^2$ hydrocarbyl group with at least one polymerizable carbon—carbon double bond;

$R^3$ is a hydrocarbyl group having 2 to 14 carbon atoms and not having a polymerizable carbon—carbon double bond;

m is a number in the range from 1 to 10;

n is a number in the range from 1 to 10;

n/m is in the range from about 1 to 5; and the polymer has a number average molecular weight of at least 2,500, and a color of about 2 or less on a Gardner color scale; and formed by the polymerization in the presence of a polymerization initiator selected from the group consisting of azo compounds and organic peroxides.

2. The polymer of claim 1 wherein X is represented by the formula wherein $R^8$ is represented by the formula —C(O)—O—$R^9$ in which $R^9$ is an aliphatic group having from 1 to 20 carbon atoms.

3. The polymer of claim 2 wherein n/m is in the range from about 1 to 4.

4. The polymer of claim 2 wherein n/m is at least 1.50.

5. The polymer of claim 1 wherein n/m is in the range from about 1 to 4.

6. The polymer of claim 1 wherein n/m is at least 1.50.

7. A process for making an acrylic polymer according to claim 1, comprising:

(a) preparing a saturated polymer by polymerizing at least one alkyl (meth)acrylate monomer of the formula:

in which $R^4$ is a hydrogen atom or a saturated aliphatic group of 1 to 8 carbon atoms and $R^5$ is a saturated aliphatic group of 1 to 8 carbon atoms with at least one monomer of the formula:

(III)

in which $R^6$ is a hydrogen atom or a saturated aliphatic group of 1 to 8 carbon atoms, $R^1$ represents a divalent, aliphatic, saturated group having at least one carbon atom, and the molar ratio of the compound of formula (II) to the compound of formula (III) is in the range from about 1:1 to about 5:1.

in the presence of a polymerization initiator selected from the group consisting of azo compounds and organic peroxides; and a polymer chain terminating compound of the formula:

$R^3$—SH in which $R^3$ is a hydrocarbyl group having at least 2 carbon atoms and not having a polymerizable carbon—carbon double bond; and (b) reacting the saturated acrylic polymer of step (a) with at least one monomer of the formula:

(IV)

in which $R^7$ is either —H or —$CH_3$, in an oxirane ring-opening reaction using a non-chromium-containing catalyst, to produce a polymer having a number average molecular weight of at least 2,500.

8. The process for making a polymer according to claim 7 wherein the chemical polymerization initiator in step (a) is a non-peroxide initiator.

9. The process for making a polymer according to claim 7, wherein the acrylic polymer has a color of about 2 or less on a Gardner color scale.

10. A process for making an acrylic polymer according to claim 1, comprising:

(a) preparing a saturated acylic polymer by polymerizing at least one alkyl (meth)acrylate monomer of the formula:

(II)

in which $R^4$ is a hydrogen atom or a saturated aliphatic group of 1 to 8 carbon atoms and $R^5$ is a saturated aliphatic group of 1 to 8 carbon atoms with at least one monomer of the formula:

(III)

in which $R^6$ is a hydrogen atom or a saturated aliphatic group of 1 to 8 carbon atoms, $R^1$ represents a divalent, aliphatic, saturated group having at least one carbon atoms, and the molar ratio of the compound of formula (II) to the compound of formula (III) is in the range from about 1:1 to about 5:1;

in the presence of a non-peroxide chemical polymerization initiator containing azo group; and a polymer chain terminating compound of the formula:

$R^3$—SH in which $R^3$ is a hydrocarbyl group having at least 2 carbon atoms and not having a polymerizable carbon—carbon double bond; and

(b) reacting the saturated acrylic polymer of step (a) with at least one monomer of the formula:

(IV)

in which $R^7$ is either —H or —$CH_3$, in an oxirane ring-opening reaction using a non-chromium-containing catalyst, to produce a polymer having a number average molecular weight of at least 2,500.

11. The process for making a polymer according to claim 10, wherein the acrylic polymer has a color of about 2 or less on a Gardner color scale.

12. A gel coat composition comprising:
(a) at least one polymer;
(b) at least one thixotrope;
(c) at least one aliphatic alcohol having from 1 to 2 carbon atoms and 1 to 2 hydroxy groups; and
(d) at least one alkali metal salt of an organic acid;
wherein the polymer is an unsaturated acrylic polymer represented by the formula;

(I)

wherein;
X is an ethylene group having a pendent ester group without any polymerizable double bonds represented by the formula —C(O)—O—$R^9$ is an aliphatic group having from 1 to 20 carbon atoms;
Y is divalent saturated aliphatic group;
$R^1$ is a divalent, aliphatic, saturated hydroxyl-containing group;
$R^2$ is a hydrocarbyl group with at least one polymerizable carbon—carbon double bond;
$R^3$ is a hydrocarbyl group having 2 to 14 carbon atoms and not having a polymerizable carbon—carbon double bond;
m is a number in the range from 1 to 10;
n is a number in the range from 1 to 10;
n/m is in the range from about 1 to 5; and
the polymer has a number average molecular weight of at least 2500, and a color of about 2 or less on a Gardner color scale.

13. A gel coat composition comprising:
(a) at least one polymer; and
(b) at least one thixotrope;

wherein the polymer is an unsaturated acrylic polymer represented by the formula:

(I)

wherein

X is an ethylene group having a pendent ester group without any polymerizable double bonds represented by the formula —C(O)—C—$R^6$ is an aliphatic group having from 1 to 20 carbon atoms;

Y is a divalent saturated aliphatic group;

$R^1$ is a divalent, aliphatic hydroxyl-containing group;

$R^2$ is a hydrocarbyl group with at least one polymerizable carbon—carbon double bond;

$R^3$ is a hydrocarbyl group having 2 to 14 carbon atoms and not having a polymerizable carbon—carbon double bond;

m is a number in the range from 1 to 10;

n is a number in the range from 1 to 10;

n/m is in the range from about 1 to 5; and the polymer has a number average molecular weight of at least 2,500, and a color of about 2 or less than a Gardner color scale.

14. The gel coat composition of claim 13, further comprising a free radical Initiators.

15. The gel coat composition of claim 14, wherein the free radical initiator is a photoinitiator.

16. The gel coat of claim 13, being a UV radiation cured composition.

* * * * *

UNITED STATES PATENT AND TRADEMARK OFFICE
CERTIFICATE OF CORRECTION

PATENT NO. : 6,492,470 B2
DATED : December 10, 2002
INVENTOR(S) : L. Scott Crump et al.

It is certified that error appears in the above-identified patent and that said Letters Patent is hereby corrected as shown below:

Column 2,
Line 50, replace "$R^1$" with -- $R^5$ --.

Column 4,
Line 41, replace "—CHOH—$H_2$—" with -- —CHOH—$CH_2$— --.

Column 18,
Line 48, insert the phrase -- in which $R^9$ -- after "—C(O)—O—$R^9$".

Column 19,
Line 14, replace "—C(O)—C—$R^6$" with -- -C(O)-O-$R^9$ in which $R^9$ in which $R^9$ --.

Signed and Sealed this

Thirtieth Day of December, 2003

JAMES E. ROGAN
*Director of the United States Patent and Trademark Office*